D. N. Hurlbut,
Cutter Head.
Nº 14,455.    Patented Mar. 18, 1856.
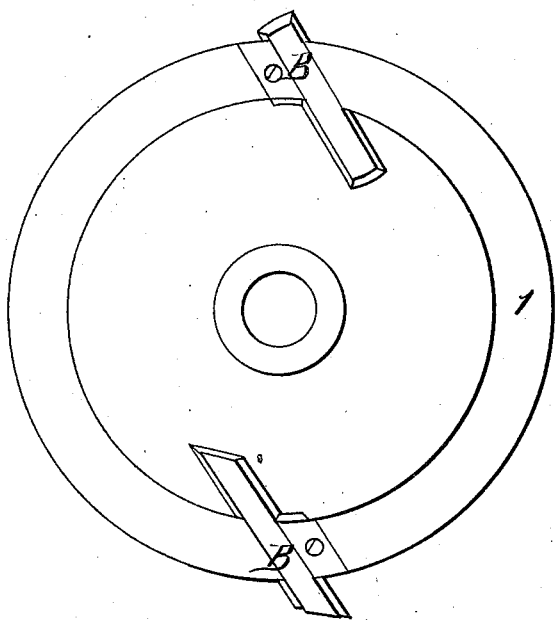
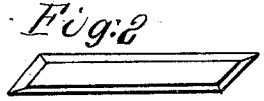
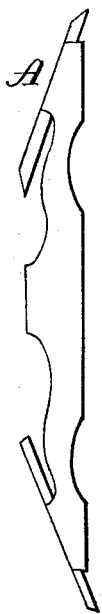

UNITED STATES PATENT OFFICE.

DANL. N. HURLBUT, OF UTICA, NEW YORK.

ARRANGEMENT OF ROTARY PLANING-KNIVES.

Specification of Letters Patent No. 14,455, dated March 18, 1856.

*To all whom it may concern:*

Be it known that I, DANIEL N. HURLBUT, of Utica, in the State of New York, have invented certain new and useful Improvements in the Arrangement of Cutters in Rotary Planing-Machines, which I verily believe was not known or used prior to the invention thereof by me; and I do hereby declare that the following is a full and exact description of the construction of the same, reference being had to the annexed drawings, making a part of this specification, like letters referring to the same parts thereof.

The nature of my improvement consists, as will be seen, in Figure 1, in placing the tools or cutters on the back side of the rim of the wheel, which is beveled toward the edge in such form as to admit of their projecting beyond the face of the wheel, on the opposite side and being fastened, by having the edges of the tools beveled, and a wedge at its side being bolted down onto the wheel pressing and firmly holding the tool.

The advantage gained by using the wedge Fig. 5, is that the cutters, after being placed in their proper position, in rotation to the outer edge of the wheel, may be fastened as desired by direct downward pressure; thereby overcoming the liability to move the cutters endwise, in fastening them; as is usually the case; when fastened by turning a bolt with its head bearing directly upon the cutting tool.

The cutters when arranged as described act upon the surface to be reduced as saw teeth; and as such will perform more labor than knives of the usual form in rotary planing cutters. The under side of the tool, or that side which comes in conflict with that part to be reduced from the board, being beveled, as described, correspondingly with the wedge, Fig. 5, is of the form, of a saw tooth, filed as is usually called fleming. By using the wheel I may attach as many knives as are best suited to the labor to be performed. By projecting each cutter an equal distance beyond the disk they are made to traverse in perfect line.

The tools are made straight as Fig. 2, and form the manner of arranging and fastening them as above described. Each end of them is pointed and used as a cutting edge, and may be changed or reversed when one end becomes dull from use.

Figure 1 is a horizontal view of the wheel to which the cutters or tools are attached or inserted in its back side. Fig. 3 is an end view of the cutting tool. Fig. 4 is a view of the wheel; or of one half its diameter as cut about in the center.

The outer rim of the wheel, as seen at A in Figs. 1 and 4 is thicker toward the center of the wheel, or its inner edge. The direction of the cutters across the above outer rim is such as, if continued across the wheel, would cut off about one fourth of its diameter.

Fig. 3 represents the form of the tool. Shows that the groove in the outer rim of the wheel must be correspondingly beveled, and when in its place and fastened by the wedge Fig. 5 being bolted to the wheel, is dovetailed in and held securely by being pressed by the wedge against the opposite shoulder of the groove in the rim.

B in Fig. 1 is a tool or cutter with is flat surface toward the board or timber to be planed, which does not project as far from the center of the wheel as the other cutters, but is grooved deeper into the rim that it may smooth the surface after its having been reduced in thickness by the other cutters. The tool B is also pointed at each end and may be reversed or changed endwise when desired.

What I claim as new and for which only I desire to procure a patent in the above described machine, is as follows:

The arrangement of the cutters, and manner of securing them to the outer rim of the wheel, substantially as set forth and described.

D. N. HURLBUT.

Witnesses:
WM. DENT,
H. R. WHITE.